2,897,208
PROCESS FOR MAKING OXIRANE COMPOUNDS

Benjamin Phillips, Charleston, and Paul S. Starcher, South Charleston, W. Va., assignors to Union Carbide Corporation, a corporation of New York No Drawing. Application December 17, 1956
Serial No. 628,551

6 Claims. (Cl. 260—326)

This invention relates to a new class of organic chemical compounds suitable for use as plasticizers and stabilizers for resin compositions. More particularly, this invention relates to 4,5-epoxycyclohexane-1,2-dicarboximides, a method for producing the same and to resin compositions containing the same.

The 4,5-epoxycyclohexane-1,2-dicarboximides of this invention can be represented by the general formula:

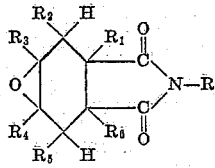

wherein R represents members selected from the group consisting of hydrogen atoms and alkyl groups containing from one through twelve carbon atoms and $R_1$ through $R_6$ represent hydrogen atoms and lower alkyl groups, the total number of carbon atoms in $R_1$ through $R_6$ not exceeding twelve.

The 4,5-epoxycyclohexane-1,2-dicarboximides have been found to be useful as plasticizers and stabilizers for the halogen-containing vinyl-type resins and particularly for the polyvinyl chloride resins and the vinyl chloride-acrylonitrile copolymer resins. Compositions comprising halogen-containing vinyl-type resins and 4,5-epoxycyclohexane-1,2-dicarboximides have been found to be useful in preparing sheeted material for calendering and laminating operations.

In preparing the 4,5-epoxycyclohexane-1,2-dicarboximides of this invention, a typical 4-cyclohexene-1,2-dicarboximide, such as, for example, N-(n-butyl)-4-cyclohexene-1,2-dicarboximide, is reacted with peracetic acid or acetaldehyde monoperacetate at a temperature in the range of from 0° C. to 100° C. at atmospheric pressures. The tetrahydrophthalimides are preferably reacted with organic solvent solutions of peracetic acid or acetaldehyde monoperacetate. Typical solvent solutions of acetaldehyde monoperacetate or peracetic acid can be those prepared according to the processes disclosed in copending applications Serial No. 303,152, filed August 7, 1952, now Patent No. 2,785,185 and Serial No. 374,142, filed August 13, 1953, now abandoned.

Typical 4-cyclohexene-1,2-dicarboximides which can be readily employed in the process of this invention to produce a host of 4,5-epoxycyclohexane-1,2-dicarboximides include N-ethyl-1,2-dimethyl-4-cyclohexene-1,2-dicarboximide; N-butyl-1,2-dimethyl-4-cyclohexene-1,2-dicarboximide; N-octyl-1,2-dimethyl-4-cyclohexene-1,2-dicarboximide; N-2-ethylhexyl-1,2-dimethyl-4-cyclohexene-1,2-dicarboximide; N-decyl-1,2-dimethyl-4-cyclohexene-1,2-dicarboximide; N-decyl-1,2,4-trimethyl-4-cyclohexene-1,2-dicarboximide; N-octyl-1,2,4-trimethyl-4-cyclohexene-1,2-dicarboximide; N-2-ethylhexyl-1,2,4-trimethyl-4-cyclohexene-1,2-dicarboximide; N-butyl-1,2,4-trimethyl-4-cyclohexene-1,2-dicarboximide; N-ethyl-1,2,4-trimethyl-4-cyclohexene-1,2,-dicarboximide; 1,2-dimethyl-4-cyclohexene-1,2-dicarboximide; 1,2,4-trimethyl-4-cyclohexene-1,2-dicarboximide; 1,2,5-trimethyl-4-cyclohexene-1,2-dicarboximide; 1,2,3-trimethyl-4-cyclohexene-1,2-dicarboximide; N-ethyl-1,2,5-trimethyl-4-cyclohexene-1,2-dicarboximide; N-butyl-1,2,5-trimethyl-4-cyclohexene-1,2-dicarboximide; N-methyl-1,2,5-trimethyl-4-cyclohexene-1,2-dicarboximide; N-n-octyl-1,2,5-trimethyl-4-cyclohexene-1,2-dicarboximide; N-2-ethylhexyl-1,2,5-trimethyl-4-cyclohexene-1,2-dicarboximide; N-decyl-1,2,5-trimethyl-4-cyclohexene-1,2-dicarboximide; N-decyl-1,2,3-trimethyl-4-cyclohexene-1,2-dicarboximide; N-2-ethylhexyl-1,2,3-trimethyl-4-cyclohexene-1,2-dicarboximide; N-ethyl-1,2,3-trimethyl-4-cyclohexene-1,2-dicarboximide; N-methyl-1,2,3-trimethyl-4-cyclohexene-1,2-dicarboximide; N-n-octyl-1,2,3-trimethyl-4-cyclohexene-1,2-dicarboximide; N-butyl-1,2,3-trimethyl-4-cyclohexene-1,2-dicarboximide. As may be readily observed, the above-mentioned imides are readily obtained from the corresponding anhydrides and aminating agents or maleimides and a diene.

In carrying out the process of this invention for preparing the 4.5-epoxycyclohexane-1,2-dicarboximides, a typical tetrahydrophthalimide, such as for example, tetrahydrophthalimide, is dissolved in acetone and reacted with a solution of peracetic acid in acetone at a temperature of about 40° C. for a period of about five hours. After the reaction period is completed, the mixture can be cooled and filtered and the product crystallized from the reaction mixture and purified by conventional procedures, such as, recrystallizing from a solvent. If desired, the tetrahydrophthalimide can be dissolved in a solvent, such as ethylbenzene and reacted with acetaldehyde monoperacetate in the form of a solution in acetone at a temperature of about 70° C. in a still equipped with a column so that the light boiling products, such as acetaldehyde, acetone and acetic acid can be removed continuously from the still as the starting material is being added. The product then can be obtained as a residue product and worked up in any conventional manner.

The following examples illustrate the novel 4.5-epoxycyclohexane-1,2-dicarboximides, the methods for making them and the resin compositions containing the same.

In these examples the analysis for the epoxy group content of an epoxide sample is based upon its reaction with pyridine hydrochloride to form pyridine and the corresponding chlorhydrin of the epoxide. This analysis can be performed, for example, by introducing into a pressure bottle, containing 25 milliliters of 1 N pyridine hydrochloride in chloroform, an amount of epoxide sample calculated to react with about 50 percent of the pyridine hydrochloride. The bottle is then sealed and the contents heated in a steam bath for a period of about one hour. At the end of this time, the bottle and contents are cooled, ten drops of phenolphthalein indicator (1.0 gram per 100 milliliters of 60 percent ethanol) added, and the mixture titrated to a permanent red endpoint with a standard 0.2 N alcoholic potassium hydroxide solution. A blank is also run in precisely the same fashion without, however, the inclusion of a sample. From the titration data thus obtained, the amount of pyridine hydrochloride consumed by reaction with the epoxide sample can be calculated and from this the epoxy group content can be determined.

The analyses in the examples for determining epoxidant, i.e., peracetic acid or acetaldehyde monoperacetate, content can be performed, for example, by introducing one to 1.5 grams of a sample of unknown epoxidant concentration into a flask containing a mixture of 60 milliliters of 50 weight percent aqueous sulfuric acid solution and 5 milliliters of a saturated potassium iodide solution. The flask is swirled to mix the solutions and then titrated immediately with a 0.1 N aqueous sodium thiosulfate solution to a colorless endpoint. From the titration data thus obtained, a determination of epoxidant content can be made.

In order to determine the acetic acid content of the reaction mixtures in the examples, the following procedure can be used, for example, another sample of approximately the same size can be taken at the same time and introduced into a flask containing about 100 milliliters of water and about 15 milliliters of acetaldehyde. The flask and contents are allowed to stand for ten to fifteen minutes after mixing so as to permit whatever peracetic acid and/or acetaldehyde monoperacetate is present in the sample to be converted to acetic acid. The acetic acid of the solution is then titrated with a 0.5 N sodium hydroxide solution using a phenolphthalein indicator. The amount of acetic acid originally present in the sample then can be taken to be equal to the final acetic acid content after conversion, as determined by titration with sodium hydroxide, minus the amount of acetic acid formed by the reaction of peracetic acid with acetaldehyde, or the decomposition of acetaldehyde monoperacetate, originally present in the sample. The amount of acetic acid formed by reaction of peracetic acid with acetaldehyde, or from the decomposition of acetaldehyde monoperacetate, may be calculated from the previous sodium thiosulfate titration determination of epoxidizing agent content on the basis of two mols of acetic acid being formed from each mol of peracetic acid or acetaldehyde monoperacetate.

EXAMPLE 1

*Preparation of 4-cyclohexene-1,2-dicarboximide*

One thousand two hundred fifteen grams of a 28 percent aqueous ammonia solution were added with stirring to 1520 grams of 4-cyclohexene-1,2-dicarboxylic anhydride at a temperature of 90° C. over a period of 1¾ hours. After the addition was complete, the mixture was heated under reflux at a temperature of 110° C. for ½ hour and the water was removed at atmospheric pressure until the kettle temperature reached 260° C. The material in the kettle was then cooled to 150° C. and filtered. The hot filtrate was poured into 3 liters of a petroleum hydrocarbon solvent, "Apco Thinner." A white crystalline product was obtained (1359 grams isolated by filtration) in a yield of 90 percent having a melting point of 129° C. to 132° C. Recrystallization twice from ethyl acetate afforded crystals of 4-cyclohexene-1,2-dicarboximide having a melting point of 135° C.

EXAMPLE 2

*Preparation of 4,5-epoxycyclohexane-1,2-dicarboximide*

A solution of 15.1 grams of 4-cyclohexene-1,2-dicarboximide, prepared according to Example 1, in 50 grams of acetone was heated with stirring to a temperature of 40° C. Fifty-two grams of a 22.1 percent solution of peracetic acid in acetone were added dropwise over a period of 1.25 hours. After an additional 3½ hours at a temperature of 40° C., the reaction mixture was cooled and the material which crystallized out was filtered and dried. There were recovered 9 grams of a white crystalline solid melting at a temperature of from 233° C. to 236° C. A recrystallization from an acetone-ethyl acetate mixture provided a material melting at a temperature of 238° C. to 240° C. and having a purity by epoxide analysis of 95.1 percent calculated as 4,5-epoxycyclohexane-1,2-dicarboximide. An analysis for N: Calc., 8.38 percent. Found, 8.55 percent.

EXAMPLE 3

*Preparation of 4,5-epoxycyclohexane-1,2-dicarboximide*

One-tenth mol of tetrahydrophthalimide having a melting point of 135° C. was dissolved in 50 grams of acetone and heated to 40° C. A peracetic acid (0.15 mol) solution in acetone was added to the above imide solution over a period of 1.25 hours at 40° C. After an additional 3.5-hour reaction period, the product began to crystallize out. The reaction mixture was cooled to 0° C. and filtered. The filtrate was allowed to stand in the ice bath for two days and another crop of crystals which came down was filtered. A total of 13 grams of white crystalline product was obtained. An epoxide analysis by the pyridine hydrochloride method indicated a purity of 86 percent calculated as 4,5-epoxycyclohexane-1,2-dicarboximide. The yield was approximately 72 percent of theory. A portion of the crude product was recrystallized twice from an acetone-ethyl acetate mixture and gave a white crystalline product melting at 242° C. to 244° C. and having a purity of 96 percent as indicated by an epoxide analysis.

EXAMPLE 4

*Preparation of N-butyl-4,5-epoxycyclohexane-1,2-dicarboximide*

N-(n-butyl)tetrahydrophthalimide (103 grams, 0.5 mol), dissolved in twice its weight of ethylbenzene was heated under reflux to a temperature of 70° C. in a still equipped with a 4-foot column packed with glass helices. Acetaldehyde monoperacetate (120 grams, 1 mol) in the form of a 41 percent solution in acetone was added to the still contents at a uniform rate over a period of 1.5 hours. Acetaldehyde, acetone and acetic acid were removed continuously from the still during the addition.

There was obtained a solution of N-butyl-4,5-epoxycyclohexane-1,2-dicarboximide. The amount of the epoxy compound present in the solution was found by analysis to be 57 grams (0.26 mol).

The yield was 52 percent of theory, based on the starting imide. The efficiency, based on the available active oxygen in the acetaldehyde monoperacetate, was 26 percent.

EXAMPLE 5

*Preparation of N-butyl-4,5-epoxycyclohexane-1,2-dicarboxide*

A solution of 1.8 mols of peracetic acid in acetone (19.7 percent) was added over a period of 1.5 hours to 1.2 mols of N-butyl-tetrahydrophthalimide at a temperature of 30° C. The reaction was continued for an additional 5.5 hours at which time 92 percent of the theoretical amount of peracetic acid had been used. The reaction mixture was then fed over a period of 3 hours into a still kettle containing 1000 grams of ethylbenzene under reflux at a kettle temperature of 65° C. and a distillate consisting of acetone, acetic acid, peracetic acid and ethylbenzene was removed at the still head. Fractionation of the kettle material gave an 80 percent yield of N-butyl-4,5-epoxycyclohexane-1,2-dicarboximide, a white crystalline solid having a boiling point range of 160° C. to 164° C. at 2 mm. of Hg pressure and a melting point range of 60° C. to 71° C. The purity as determined by an epoxide analysis was 98 percent. Three disastereoisomers are considered likely and probably account for the melting point range of the distilled material.

EXAMPLE 6

*Preparation of N-(2-ethylhexyl)-1-methyl-4-cyclohexene-1,2-dicarboximide*

A mixture of 1000 cc. of toluene and 166 grams of 1-methyl-4-cyclohexene-1,2-dicarboxylic acid anhydride was heated to reflux on an 8-inch column packed with type 316 s.s. 0.24 x 0.24 protruded packing. The heat was turned off and 129 grams of 2-ethylhexylamine were added dropwise over a period of 12 minutes. Heating was then continued and 450 cc. of toluene were removed in order to raise the reaction temperature. The water formed during the reaction (16 cc.) was removed. The product, which flash distilled, had a boiling point of 144° C. to 149° C. at 2 mm. of Hg absolute and a refractive index ($n_D^{30}$) of 1.4832.

A sample of the 257 grams of distillate, which was analyzed for unsaturation by the sodium bromide-bromine method, was found to have a purity of 100 percent calculated as N-(2-ethylhexyl)-1-methyl-4-cyclohexene-1,2-dicarboximide.

An analysis for $C_{17}H_{27}O_2N$:
Calc.:
　Percent Carbon=73.60
　Percent hydrogen=9.81
　Percent nitrogen=5.05
Found:
　Percent carbon=74.02
　Percent hydrogen=10.11
　Percent nitrogen=5.40

EXAMPLE 7

Preparation of N-(2-ethylhexyl)-1-methyl-4,5-epoxycyclohexane-1,2-dicarboximide

Two hundred forty seven grams of N-(2-ethylhexyl)-1-methyl-4-cyclohexene-1,2-dicarboximide were charged to a 1-liter 4-neck flask equipped with stirrer, thermometer, condenser and dropping funnel. Thereupon, 317 grams of a 26.6 percent solution of peracetic acid in ethyl acetate were added dropwise to the stirred imide at a temperature of 40° C. over a period of 45 minutes. After the addition was complete, the temperature of the reaction mixture was maintained at 40° C. for an additional 4¾ hours, after which time an analysis for peracetic acid indicated that the reaction was essentially complete. The reaction mixture was then added dropwise into a still kettle containing ethylbenzene under reflux. Ethyl acetate, acetic acid and ethylbenzene were removed continuously as a distillate. The residue was reduced in volume to 271 grams and transferred to a 1-plate column. The product, N-(2-ethylhexyl)-1-methyl-4,5-epoxycyclohexane-1,2-dicarboximide, was obtained by distillation at low pressure and afforded a light-colored liquid having a refractive index ($n_D^{30}$) of 1.4876, an iodine number of 0.8, a Gardner color of 4, and a purity, as determined by an epoxide analysis, of 93.4 percent.

EXAMPLE 8

Vinyl chloride resin plasticized with N-(2-ethylhexyl)-1-methyl-4,5-epoxycyclohexane-1,2-dicarboximide A recipe was prepared comprising polyvinyl chloride and N-(2-ethylhexyl)-1-methyl-4,5-epoxycyclohexane-1,2-dicarboximide. The amount of epoxide employed comprised 69.0 parts per 100 parts of polyvinyl chloride. The plasticized composition was tested and had the following physical properties:

| | |
|---|---|
| Plasticizer (parts per hundred parts of resin) | 69 |
| Plasticizer, percent | 41.0 |
| Tensile, p.s.i. (24.5° C.) | 2475 |
| Elongation, percent (24.5° C.) | 320 |
| Load at 100% elong., p.s.i. (24.5° C.) | 1240 |
| ASTM stiffness modulus, p.s.i. (24.5° C.) | 535 |
| $T_F$, ° C | 0 |
| $T_4$, ° C | 13 |
| Brittle temperature, ° C | 4 |
| Percent extraction: Oil, 10 days at 25° C | 2.5 |
| Percent extraction: Water, 10 days at 25° C | 2.6 |
| Durometer "A" hardness (24.5° C.) | 62 |
| SPI volatile loss, percent in 24 hrs. at 70° C | 14.0 |
| Heat-stability data: | |
| Initial color, percent BLR | 68 |
| Min. at 158° C. to 80% BLR | — |
| Min. at 158° C. to 75% BLR | — |
| Min. at 158° C. to 60% BLR | 19 |
| Min. at 158° C. to 15% BLR | >420 |
| Sweatout | None |

As may be observed, N-(2-ethylhexyl)-1-methyl-4,5-epoxycyclohexane-1,2-dicarboximide is a plasticizer for polyvinyl chloride and exhibits heat stabilizing effects.

In reporting the results of the evaluation of the composition, certain symbols and abbreviations have been employed for the sake of simplicity and brevity. Accordingly, the following symbols and abbreviations are defined as follows:

(a) ASTM=American Society of Testing Materials.

(b) $T_F$ and $T_4$=points corresponding to 135,000 and 10,000 pounds per square inch respectively on a stiffness-temperature curve obtained in accordance with the procedure set forth in the manual of ASTM D1043–51.

(c) Brittle temperature=the temperature obtained by means of low temperature impact test according to the procedure set forth in the manual of ASTM D746–52T.

(d) SPI volatility loss=value obtained in accordance with the procedure in the manual of ASTM D1203–52T.

(e) Durometer "A" hardness=an indentation measurement of hardness obtained with the Shore durometer, "A" head.

(f) Percent BLR=the discoloration of strips of fluxed material as compared with original sheet and determined by means of a photovolt reflection meter, Model 610, equipped with a Wratten C–5 blue filter. This color is reported as percent blue-light reflectance as determined with the transparent sheet mounted on a block of magnesium carbonate which reflects 100 percent of the incident beam of blue light.

(g) Sweat-out=visual and manual examinations to detect any exudation of plasticizer that may appear as beads, a smear or a blush on the surface of the plasticized material. The observation is made after two weeks of aging at 25° C.

This application is a continuation-in-part of applications Serial No. 303,152, filed August 7, 1952, now U.S. 2,785,185 issued March 12, 1957, and Serial No. 374,142, filed August 13, 1953, now abandoned.

What is claimed is:

1. As new epoxides, 4,5-epoxycyclohexane-1,2-dicarboximides characterized by the general formula:

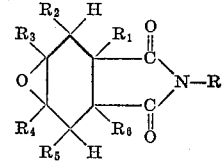

wherein R represents members selected from the group consisting of hydrogen and alkyl groups containing from 1 through 12 carbon atoms and $R_1$ through $R_6$ represent members selected from the group consisting of hydrogen and lower alkyl groups, the sum of the number of carbon atoms in $R_1$ through $R_6$ not exceeding twelve.

2. As a new epoxide, 4,5-epoxycyclohexane-1,2-dicarboximide.

3. As a new epoxide, N-butyl-4,5-epoxycyclohexane-1,2-dicarboximide.

4. As a new epoxide, N-(2-ethylhexyl)-1-methyl-4,5-epoxycyclohexane-1,2-dicarboximide.

5. A process for preparing 4,5-epoxycyclohexane-1,2-dicarboximides which comprises reacting a 4-cyclohexene-1,2-dicarboximide and peracetic acid at a temperature in the range of from 0° C. to 100° C.

6. A process for preparing 4,5-epoxycyclohexane-1,2-dicarboximides which comprises reacting a 4-cyclohexene- 1,2-dicarboximide and acetaldehyde monoperacetate at a temperature in the range of from 0° C. to 100° C.

References Cited in the file of this patent

UNITED STATES PATENTS

| | | |
|---|---|---|
| 2,452,315 | Morgan et al. | Oct. 26, 1948 |
| 2,547,542 | Rowland | Apr. 3, 1951 |
| 2,698,851 | Long et al. | Jan. 4, 1955 |
| 2,720,497 | Hillyer | Oct. 11, 1955 |
| 2,732,357 | Sprung | Jan. 24, 1956 |
| 2,784,199 | Grogan et al. | Mar. 5, 1957 |
| 2,795,589 | Bluestone | June 11, 1957 |